US012804051B2

(12) United States Patent
Kawashima et al.

(10) Patent No.: US 12,804,051 B2
(45) Date of Patent: Nov. 17, 2026

(54) INFORMATION COLLECTION DEVICE, INFORMATION COLLECTION METHOD, AND PROGRAM

(71) Applicants: CITIZEN WATCH CO., LTD., Tokyo (JP); CITIZEN SYSTEMS JAPAN CO., LTD., Tokyo (JP)

(72) Inventors: Takeaki Kawashima, Saitama (JP); Yasuaki Irisawa, Saitama (JP); Yoshikazu Noguchi, Saitama (JP); Yasuhiro Kageyama, Saitama (JP); Ayano Saeki, Tokyo (JP); Satoshi Takahashi, Tokyo (JP)

(73) Assignees: CITIZEN WATCH CO., LTD., Tokyo (JP); CITIZEN SYSTEMS JAPAN CO., LTD., Tokyo (JP)

( * ) Notice: Subject to any disclaimer, the term of this patent is extended or adjusted under 35 U.S.C. 154(b) by 193 days.

(21) Appl. No.: 18/835,334

(22) PCT Filed: Jan. 17, 2023

(86) PCT No.: PCT/JP2023/001234
§ 371 (c)(1),
(2) Date: Aug. 1, 2024

(87) PCT Pub. No.: WO2023/149201
PCT Pub. Date: Aug. 10, 2023

(65) Prior Publication Data

US 2025/0141977 A1 May 1, 2025

(30) Foreign Application Priority Data

Feb. 3, 2022 (JP) ................................ 2022-015689

(51) Int. Cl.
*G06F 15/16* (2006.01)
*H04L 67/565* (2022.01)

(52) U.S. Cl.
CPC ................................ *H04L 67/565* (2022.05)

(58) Field of Classification Search
USPC ........................................................ 709/203
See application file for complete search history.

(56) References Cited

U.S. PATENT DOCUMENTS

2006/0015631 A1* 1/2006 Bregant-Belin ........ H04L 67/51 709/230
2006/0200545 A1* 9/2006 Fromentoux ......... H04L 47/781 709/224

(Continued)

FOREIGN PATENT DOCUMENTS

JP 2014010770 A 1/2014
JP 2019071558 A 5/2019

(Continued)

OTHER PUBLICATIONS

Extended European Search Report for counterpart European Application No. 23749517.1, issued by the European Patent Office on Oct. 7, 2025.

(Continued)

*Primary Examiner* — Alan S Chou

(57) ABSTRACT

Provided is an information collection apparatus which collects information on one or more devices through one or more mediation apparatuses, the information collection apparatus comprising: a communication unit which receives, from a plurality of provider apparatuses that provide a customer with a service of managing the one or more devices, first job information describing a specific processing that a target is caused to execute, in a manner unique to each of the plurality of provider apparatuses, the target including both the one or more mediation apparatuses and the one or more devices, or only the one or more mediation apparatuses; and a conversion unit which converts the first job information into second job information describing the (Continued)

processing in a manner such that the one or more mediation apparatuses can recognize it, and delivers the second job information to the one or more mediation apparatuses through the communication unit.

16 Claims, 5 Drawing Sheets

(56) References Cited

U.S. PATENT DOCUMENTS

| | | | | |
|---|---|---|---|---|
| 2008/0235371 | A1 | 9/2008 | Silverthorne | |
| 2014/0002836 | A1 | 1/2014 | Ishino | |
| 2014/0181277 | A1 | 6/2014 | Burns | |
| 2015/0156056 | A1* | 6/2015 | Lowery | H04L 69/08<br>455/420 |
| 2017/0346963 | A1 | 11/2017 | Mizunashi | |
| 2019/0109921 | A1 | 4/2019 | Matsushima | |
| 2020/0026732 | A1* | 1/2020 | Bequet | G06F 16/164 |
| 2020/0106658 | A1* | 4/2020 | A | H04L 41/0853 |
| 2020/0382499 | A1* | 12/2020 | Sosiade | H04L 63/083 |
| 2021/0028980 | A1* | 1/2021 | R | H04L 41/0816 |
| 2022/0028252 | A1 | 1/2022 | Reddy | |

FOREIGN PATENT DOCUMENTS

| | | | |
|---|---|---|---|
| JP | 6922422 | B2 | 8/2021 |
| KR | 20180036068 | A | 4/2018 |

OTHER PUBLICATIONS

Juhani Latvakoski et al: "Towards Horizontal Architecture for Autonomic M2M Service Networks", Future Internet, vol. 6, No. 2, May 6, 2014, pp. 261-301.

International Search Report and Written Opinion (ISA/237) of the International Search Authority for International Patent Application No. PCT/JP2023/001234, mailed by the Japan Patent Office on Apr. 4, 2023.

* cited by examiner

INFORMATION COLLECTION DEVICE, INFORMATION COLLECTION METHOD, AND PROGRAM

BACKGROUND

1. Technical Field

The present invention relates to an information collection apparatus, an information collection method, and a computer readable storage medium.

2. Related Art

Patent Document 1 describes "The device management PF 111 sends information on the device 102 to the device management unit 121 corresponding to an account (for example, a customer, a contractor, etc.) that has a contract with a service provider that provides a service in accordance with the contract." (Paragraph 0020).

PRIOR ART DOCUMENT

Patent Document

Patent Document 1: Japanese Patent Application Publication No. 2019-71558

DESCRIPTION OF EXEMPLARY EMBODIMENTS

Hereinafter, the present invention will be described through embodiments of the invention, but the following embodiments do not limit the invention according to the claims. In addition, not all of the combinations of features described in the embodiments are essential to the solution of the invention.

Figure 1:
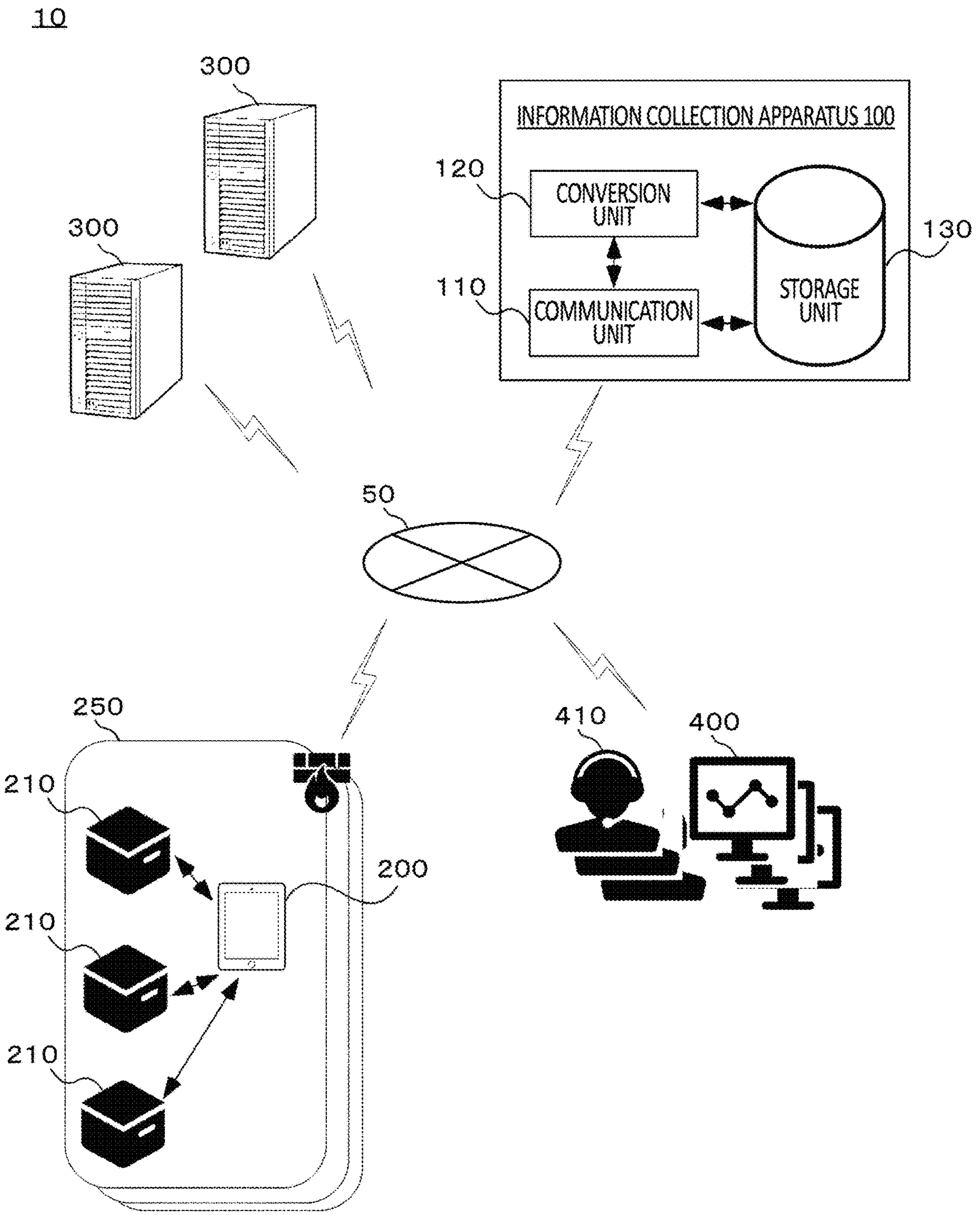
FIG. 1 is a schematic view of an information collection system 10.

FIG. 1 is a schematic view of an information collection system 10. The information collection system 10 includes an information collection apparatus 100, a mediation apparatus 200, a device 210, a provider apparatus 300, and a customer terminal 400. The information collection apparatus 100, the mediation apparatus 200, the provider apparatus 300, and the customer terminal 400 can communicate with each other through a communication network 50. The communication network 50 is, for example, a communication line such as Internet or a mobile telephone network (3G, LTE).

The information collection system 10 provides a customer 410 with a service that allows remote monitoring or remote maintenance of one or more devices 210 to be managed by the customer 410, by the information collection apparatus 100 cooperating with the mediation apparatus 200 and the provider apparatus 300. The information collection system 10 in the present embodiment includes a plurality of devices 210, a plurality of mediation apparatuses 200, a plurality of provider apparatuses 300, and a plurality of customers 410, each of which has identification information (ID) for identifying each individual.

The one or more devices 210 to be managed by the customer 410 are, for example, printers, photocopiers, multifunction machines, POS, or the like, and are placed in a Local Area Network (LAN) 250 being under the management of the customer 410. The one or more devices 210 are placed in, for example, a company of the customer 410.

In the present embodiment, the customer 410 is a user, that is, an end user, of the device 210. The customer 410 utilizes the service mentioned above through the customer terminal 400 at a location remote from the one or more devices 210 to be managed by the customer 410.

In the present embodiment, the mediation apparatus 200 is placed in the LAN 250 being under the management of the customer 410 together with the one or more devices 210. The mediation apparatus 200 is communicably connected to the one or more devices 210 by the LAN 250. It should be noted that the LAN 250 may be wired or wireless.

The mediation apparatus 200 obtains, from the information collection apparatus 100 through the communication network 50, second job information being based on first job information generated by the one or more provider apparatuses 300. The mediation apparatus 200 further causes a device 210 to be managed being in the LAN 250 to execute a specific processing, for example, a maintenance operation or a firmware update in accordance with the second job information or refers to state information stored in the mediation apparatus 200 for monitoring a state of the device 210, and reports result information indicating the result to the information collection apparatus 100. It should be noted that the mediation apparatus 200 may obtain third job information generated by the information collection apparatus 100 from the information collection apparatus 100 through the communication network 50 together with the second job information, cause the device 210 to execute the specific processing in accordance with the second job information or refer to reference information stored in the mediation apparatus 200, and report result information indicating the result to the information collection apparatus 100 in accordance with the third job information. It should be noted that the result information is also an example of device information.

The mediation apparatus 200 also collects the state information for monitoring the state of the device 210 to be managed being in the LAN 250, and provides it to the information collection apparatus 100 through the communication network 50. The state of the device 210 may refer to, for example, a state where a power on or off state of the device 210 is, or a state where an error has occurred. It should be noted that the state information is an example of device information. It should be noted that the LAN 250 may be protected by a firewall, and in this case, the mediation apparatus 200 has a communication function going beyond the firewall.

In the present embodiment, each of one or more mediation apparatuses 200 has an Application Programing Interface (API)-KEY, and also the information collection apparatus 100 has a WebAPI for communication with the one or more mediation apparatuses 200. Each of the mediation apparatuses 200 accesses the information collection apparatus 100 by using the API-KEY, has its API-KEY authenticated by the WebAPI of the information collection apparatus 100, and has its correspondence relationship with one or more customers 410 specified.

It should be noted that the customer 410 may be a manufacturer of the device 210, and in this case, the customer 410 may remotely monitor or maintain the one or more devices 210, which are his/her in-house products, placed in each of a plurality of LANs 250, through the mediation apparatus 200 placed in each of the LANs 250.

The information collection apparatus 100 is a server placed in a center (cloud), for example, and collects information on the one or more devices 210 through the one or more mediation apparatuses 200. The information collection apparatus 100 includes a communication unit 110 and a conversion unit 120. The information collection apparatus 100 according to the present embodiment further includes a storage unit 130.

The communication unit 110 receives the first job information from the plurality of provider apparatuses 300. The first job information is information describing a specific processing that a target is caused to execute in a manner unique to each of the plurality of provider apparatuses 300. The target includes both the one or more mediation apparatuses 200 and the one or more devices 210, or one or more mediation apparatuses 200 only.

The communication unit 110 also receives device information on the one or more devices 210 from the one or more devices 210 through the one or more mediation apparatuses 200. The communication unit 110 also may receive the device information from the one or more mediation apparatuses 200 having stored therein the device information, instead of receiving the device information from the one or more devices 210.

The manner unique to each of the plurality of provider apparatuses 300 mentioned above may be, as an example, such that a type of a command describing the specific processing is unique. As a specific example, the manner unique to each of the plurality of provider apparatuses 300 is one of script designation via a remote shell (rsh), script designation via a secure shell (SSH), or script designation through email automatic processing. The manner unique to each of the plurality of provider apparatuses 300 may be also, as another example, such that a format of data used to execute the command describing the specific processing is unique or that the number of arguments is unique. The manner unique to each of the plurality of provider apparatuses 300 may be also such that the type is not unique, that is, the type is common, and the format is unique. The manner unique to each of the plurality of provider apparatuses 300 may be also such that the format is not unique, that is, the format is common, and the type is unique. The manner unique to each of the plurality of provider apparatuses 300 may be also such that both the type and the format are unique.

In addition, the communication unit 110 in the present embodiment receives, from the plurality of provider apparatuses 300 together with the first job information, a device ID of the device 210 caused to execute the specific processing based on the first job information. The communication unit 110 in the present embodiment further receives, from the plurality of provider apparatuses 300 together with the first job information, a customer ID of the customer 410 who is managing the device 210 caused to execute the specific processing based on the first job information.

The conversion unit 120 converts the first job information received by the communication unit 110 into the second job information describing the specific processing that the target mentioned above is caused to execute in a manner such that the one or more mediation apparatuses 200 can recognize it. The conversion unit 120 further delivers the second job information to the one or more mediation apparatuses 200 through the communication unit 110. As an example, the conversion unit 120 in the present embodiment delivers the second job information to the mediation apparatus 200 requesting reception and delivery of the second job information.

The conversion unit 120 also converts the device information into update information in a manner unique to each of the one or more provider apparatuses 300, among the plurality of provider apparatuses 300, who manage the one or more devices 210 corresponding to the device information received by the communication unit 110. The conversion unit 120 further distributes the update information to the one or more provider apparatuses 300 through the communication unit 110. It should be noted that the manner unique to each of the one or more provider apparatuses 300 referred to here is the same as the manner mentioned above.

The storage unit 130 stores, in a mutually linked manner, an API-KEY of each of the one or more mediation apparatuses 200 and a customer ID of each of the one or more customers 410 provided with the service from the plurality of provider apparatuses 300. In addition, the storage unit 130 stores, in a mutually linked manner, a provider apparatus ID of each of the plurality of provider apparatuses 300 and a device ID of each of the one or more devices 210.

The storage unit 130 in the present embodiment stores, in a mutually linked manner, the device ID of the device 210, the API-KEY of the mediation apparatus 200 placed in the same LAN 250 as the device 210, the customer ID of the customer 410 who manages the one or more devices 210 in the LAN 250, and provider apparatus IDs of the one or more provider apparatuses 300 with which the customer 410 has a contract.

The plurality of provider apparatuses 300 provide the customer 410 with a service of managing the one or more devices 210. More specifically, each of the provider apparatuses 300 provides, on the Web to the one or more customers 410 with whom it has a contract for providing the service, an interface that allows remote monitoring or remote maintenance of the one or more devices 210 to be managed by each of the customers 410. In other words, through the interface provided by the one or more provider apparatuses 300 with which the customer 410 has a contract, the customer 410 instructs the one or more devices 210 to be managed to execute the specific processing, or views the device information sent from the devices 210 or from the mediation apparatus 200 having stored therein the device information on the devices 210.

The provider apparatus 300 sends the first job information to the information collection apparatus 100 through the communication network 50, and receives, as a response, the result information from the information collection apparatus 100. In addition, the provider apparatus 300 receives the device information from the information collection apparatus 100 through the communication network 50.

In the present embodiment, each of the one or more provider apparatuses 300 has an API, and also, the information collection apparatus 100 has an API client for communication with the one or more provider apparatuses 300. As an example, each of the provider apparatuses 300 accesses the information collection apparatus 100 via its own API, and also has its own API called by the API client of the information collection apparatus 100 and has information distributed. Instead, each of the provider apparatuses 300 may access the information collection apparatus 100 via its own agent, and also have its own agent called by the API client of the information collection apparatus 100 and have information distributed. The API or the agent of each of the provider apparatuses 300 sends the first job information to the information collection apparatus 100 or receives the device information from the information collection apparatus 100 in the manner unique to each of the provider apparatuses 300 mentioned above.

Figure 2:
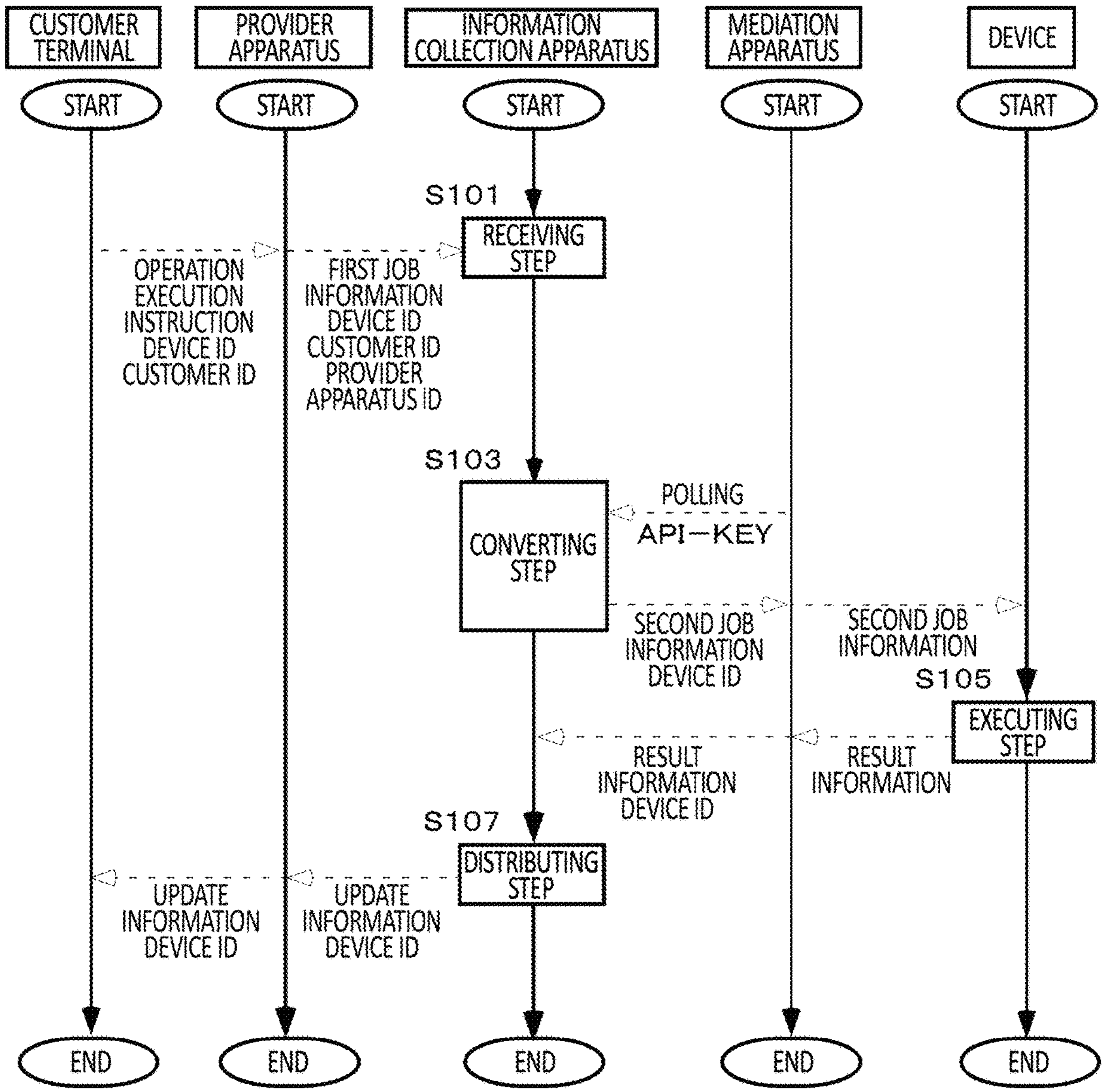
FIG. 2 is a flow diagram of an exemplary first information collection method.

FIG. 2 is a flow diagram of an exemplary first information collection method. An information collection apparatus 100 previously stores in a storage unit 130, in a mutually linked manner, a device ID of a device 210, an API-KEY of a mediation apparatus 200 placed in the same LAN 250 as the device 210, a customer ID of a customer 410 who manages one or more devices 210 in the LAN 250, and provider apparatus IDs of one or more provider apparatuses 300 with which the customer 410 has a contract. The same applies to a flow shown in FIG. 3, and repeated description will be omitted.

The flow is started by the customer 410 inputting, through a customer terminal 400, an instruction to cause the one or more devices 210 being managed by the customer 410 to execute a specific processing. That is, the customer terminal 400 sends, based on an instruction of the customer 410, an operation execution instruction to the one or more provider apparatuses 300 with which the customer 410 has a contract, together with device IDs of the one or more devices 210 and the customer ID of the customer 410. Correspondingly, the provider apparatus 300 generates, based on the operation execution instruction in a unique manner, first job information describing the specific processing that both the mediation apparatus 200 and the one or more devices 210 are caused to execute, and sends the provider apparatus ID of the provider apparatus 300 to the information collection apparatus 100 together with the first job information, the device ID, and the customer ID.

The information collection apparatus 100 receives, from a plurality of provider apparatuses 300, the first job information described above that describes in a manner unique to each of the plurality of provider apparatuses 300 (step S101). As mentioned above, the information collection apparatus 100 in the present embodiment receives the device ID, the customer ID, and the provider apparatus ID together with the first job information.

The information collection apparatus 100 converts the first job information received in the step S101 into second job information, and delivers the second job information to the mediation apparatus 200 requesting reception and delivery of the second job information (step S103). The second job information is information describing the specific processing that both the mediation apparatus 200 and the one or more devices 210 are caused to execute in a manner such that the mediation apparatus 200 can recognize it.

As for the step 103, more specifically, a conversion unit 120 of the information collection apparatus 100 links the second job information to the device ID received by a communication unit 110. The conversion unit 120 further links the second job information to the customer ID received by the communication unit 110 as well.

The conversion unit 120 further specifies, by referring to the storage unit 130, the customer ID corresponding to the API-KEY presented by the mediation apparatus 200 requesting the reception and delivery of the second job information. It should be noted that the request for the reception and delivery of the second job information may be made through polling from the mediation apparatus 200 to the information collection apparatus 100.

When the customer ID corresponding to the API-KEY matches the customer ID linked to the second job information, the conversion unit 120 further delivers the second job information to the mediation apparatus 200 requesting the reception and delivery of the second job information, through the communication unit 110. The conversion unit 120 also delivers the device ID linked to the second job information to the mediation apparatus 200 together with the second job information.

It should be noted that, as an example, the mediation apparatus 200 in the present embodiment communicates with the information collection apparatus 100 through a communication network 50 by utilizing an HTTP method. In this case, the mediation apparatus 200 may designate an endpoint of get /jobs/:deviceid to a WebAPI of the information collection apparatus 100.

In response to obtaining the second job information from the information collection apparatus 100 together with the device ID, the mediation apparatus 200 causes the device 210 corresponding to the device ID, among the one or more devices 210 connected to the mediation apparatus 200, to execute the specific processing in accordance with the second job information (step S105). The processing by the mediation apparatus 200 is intended for the mediation apparatus 200 itself to execute the specific processing in accordance with the second job information. When receiving, from the device 210 as a response to causing the device 210 to execute the specific processing, result information indicating a result of executing the specific processing, the mediation apparatus 200 also sends the result information to the information collection apparatus 100 together with the device ID of the device 210. The processing by the mediation apparatus 200 is also intended for the mediation apparatus 200 itself to execute the specific processing in accordance with the second job information.

The communication unit 110 of the information collection apparatus 100 receives the result information together with the device ID from the mediation apparatus 200 to which the second job information has been delivered. In response, the conversion unit 120 of the information collection apparatus 100 distributes the device ID and update information to the one or more provider apparatuses 300 (step S107).

More specifically, the conversion unit 120 specifies, by referring to the storage unit 130, one or more provider apparatus IDs linked to the device ID received by the communication unit 110. The conversion unit 120 further converts the result information into the update information in a manner unique to each of the one or more provider apparatuses 300 corresponding to the one or more provider apparatus ID. The conversion unit 120 further distributes the device ID and the update information to the one or more provider apparatuses 300 corresponding to the one or more provider apparatus IDs through the communication unit 110.

As a more specific example of the step S105 to the step S107, the second job information is: information that describes a specific processing for the device 210 of updating a firmware of the device 210; and information that describes a specific processing for the mediation apparatus 200 of causing the device 210 to execute the specific processing and of sending result information indicating the result to the information collection apparatus 100. When the firmware is successfully rewritten, the device 210 updates a firmware version. When receiving the update result from the device 210, the mediation apparatus 200, to the WebAPI of the information collection apparatus 100, performs presentation of the API-KEY and designation of an endpoint of post /device/:deviceid, and sends result information corresponding to the update result. The information collection apparatus 100 specifies the customer ID by authenticating the API-KEY, and simultaneously distributes, to the one or more provider apparatuses 300 with which the customer 410 corresponding to the customer ID has a contract, update information, corresponding to the result information, that a firmware number is to be updated.

The provider apparatus 300 sends the device ID and the update information received from the information collection apparatus 100 to the customer terminal 400 which is a sender of the operation execution instruction mentioned above, and the flow ends. It should be noted that, in response to the customer 410 requesting, through the customer terminal 400, to view the update information, the provider apparatus 300 may allow the customer 410 to view the update information on the Web.

As described in the present embodiment, the second job information converted from the first job information by the information collection apparatus 100 may describe the specific processing in a manner such that both the mediation apparatus 200 and the device 210 can recognize it. In this case, a target caused to execute the specific processing can include both one or more mediation apparatuses 200 and one or more devices 210. When the second job information describes the specific processing in a manner such that both the mediation apparatus 200 and the device 210 can recognize it, the mediation apparatus 200 may be the only target caused to execute the specific processing, that is, the device 210 may be excluded from the target. In addition, instead, the second job information may describe the specific processing in a manner such that the device 210 cannot recognize it but the mediation apparatus 200 can recognize it. In this case, the one or more mediation apparatuses 200 can be the only targets caused to execute the specific processing.

Even if the device 210 executes the specific processing, the mediation apparatus 200 will always cause the device 210 to execute the specific processing, and the processing will be the specific processing executed by the mediation apparatus 200. In contrast, when the specific processing is only delivering device information stored in the mediation apparatus 200 to the information collection apparatus 100, it is sufficient to simply deliver the device information obtained so far by the mediation apparatus 200 to the information collection apparatus 100, and thus the device 210 does not intervene. In this manner, both cases can be conceived where both the mediation apparatus 200 and the device 210 execute their respective specific processings and where only the mediation apparatus 200 executes the specific processing.

The second job information may previously include, as the specific processing, job information that the mediation apparatus 200 is caused to execute and job information that the device 210 is caused to execute. As an example in this case, the mediation apparatus 200 may obtain the second job information, and transfer, in accordance with the job information for the mediation apparatus 200 "transfer the job information for the device 210 to the device 210" included in the second job information, the job information for the device 210 included in the second job information to the device 210. In this case, the mediation apparatus 200 only needs to be able to recognize the job information for the device 210 as transfer data. Therefore, the job information for the device 210 may describe the specific processing in a manner such that the mediation apparatus 200 cannot recognize it, or may describe the specific processing in a manner such that the mediation apparatus 200 can recognize it. In addition, the device 210 only needs to be able to recognize the job information for the device 210. Therefore, the job information for the mediation apparatus 200 may describe the specific processing in a manner such that the device 210 cannot recognize it, or may describe the specific processing in a manner such that the device 210 can recognize it.

Further, the device 210 may execute the specific processing in accordance with the second job information, and send result information indicating the result to the mediation apparatus 200. Further, the mediation apparatus 200 may send the result information to the information collection apparatus 100 in accordance with the second job information.

According to such an information collection system 10, a function of the mediation apparatus 200 can be simplified compared to a case where each of the mediation apparatuses 200 newly generates the job information for the device 210 in accordance with the second job information. In addition, when the information collection apparatus 100 generates the second job information describing the specific processing in a manner such that any mediation apparatus 200 and any device 210 can recognize it, the second job information sent from the information collection apparatus 100 can be shared among a plurality of mediation apparatuses 200 and a plurality of devices 210, so the information collection system 10 can be simplified.

As an example of a case where the second job information describes the specific processing in a manner such that the device 210 cannot recognize it but the mediation apparatus 200 can recognize it, the mediation apparatus 200 may obtain the second job information, and refer to the device information stored in the mediation apparatus 200, for example, state information such as the firmware version of the device 210, without exchanging information with the device 210, in accordance with the second job information. The mediation apparatus 200 may further send the state information to the information collection apparatus 100 in accordance with the second job information. In this case, the mediation apparatus 200 executes the specific processing of referring to the device information stored in the mediation apparatus 200, without exchanging information with the device 210, and of sending the state information to the information collection apparatus 100, the device information returned to the information collection apparatus 100 corresponds to the result information indicating the result of executing the specific processing.

As another example of a case where a case where the second job information describes the specific processing in a manner such that the device 210 cannot recognize it but the mediation apparatus 200 can recognize it, the conversion unit 120 may generate third job information that describes a processing of causing the result information indicating the result of the target mentioned above executing the specific processing in accordance with the second job information to be returned to the information collection apparatus 100, in a manner such that the one or more mediation apparatuses 200 can recognize it. In this case, the conversion unit 120 delivers the third job information to the one or more mediation apparatuses 200 through the communication unit 110 together with the second job information.

As an example of a case where the conversion unit 120 delivers the second job information and the third job information to the mediation apparatus 200, the mediation apparatus 200 may obtain the second job information and the third job information, cause the device 210 to execute the specific processing in accordance with the second job information, and receive result information indicating the result from the device 210. The mediation apparatus 200 may further send the result information to the information collection apparatus 100 in accordance with the third job information. In this case, the mediation apparatus 200 itself executes the specific processing of instructing the device 210 to execute the specific processing and to return result information indicating the result to the mediation apparatus 200.

The specific processing executed by the mediation apparatus 200 itself in accordance with the second job information, which is described here, may include, for example, a processing in which the mediation apparatus 200 newly generates another job information describing some processing in a manner such that the device 210 can recognize it, and sends the another job information to the device 210. Specifically, first of all, the second job information may be, for example, information that describes a processing for the mediation apparatus 200 of updating the firmware of the device 210. Then, the mediation apparatus 200 that has interpreted this information may generate another job information that describes a processing for the device 210 of executing the processing of updating the firmware and of reporting a result of execution of the processing to the mediation apparatus 200, and send the another job information to the device 210.

In addition, as another example of a case where the conversion unit 120 delivers the second job information and the third job information to the mediation apparatus 200, the mediation apparatus 200 may obtain the second job information and the third job information, and refer to the device information stored in the mediation apparatus 200, for example, the state information such as the firmware version of the device 210, in accordance with the second job information. The mediation apparatus 200 may further send the state information to the information collection apparatus 100 in accordance with the third job information. In this case, the mediation apparatus 200 does not exchange information with the device 210. In addition, in this case, the mediation apparatus 200 executes the specific processing of referring to the device information stored in the mediation apparatus 200, and the device information sent to the information collection apparatus 100 corresponds to the result information indicating the result of executing the specific processing.

In this manner, the information collection apparatus 100 can generate the third job information mentioned above separately from the second job information, and deliver the second job information with the third job information added thereto to the mediation apparatus 200, thereby making the second job information specialized for describing the specific processing. Therefore, the information collection apparatus 100 can make the second job information that describes the specific processing of, for example, causing the firmware of the device 210 to be updated, shared among the plurality of mediation apparatuses 200, that is, the information collection apparatus 100 can commonly apply the second job information to the plurality of mediation apparatuses 200. In addition, with such a configuration, the information collection system 10 can eliminate a need for the mediation apparatus 200 to determine whether sending the result information to the information collection apparatus 100 is included in the specific processing described by the second job information. This allows the information collection system 10 to simplify a system configuration.

Figure 3:
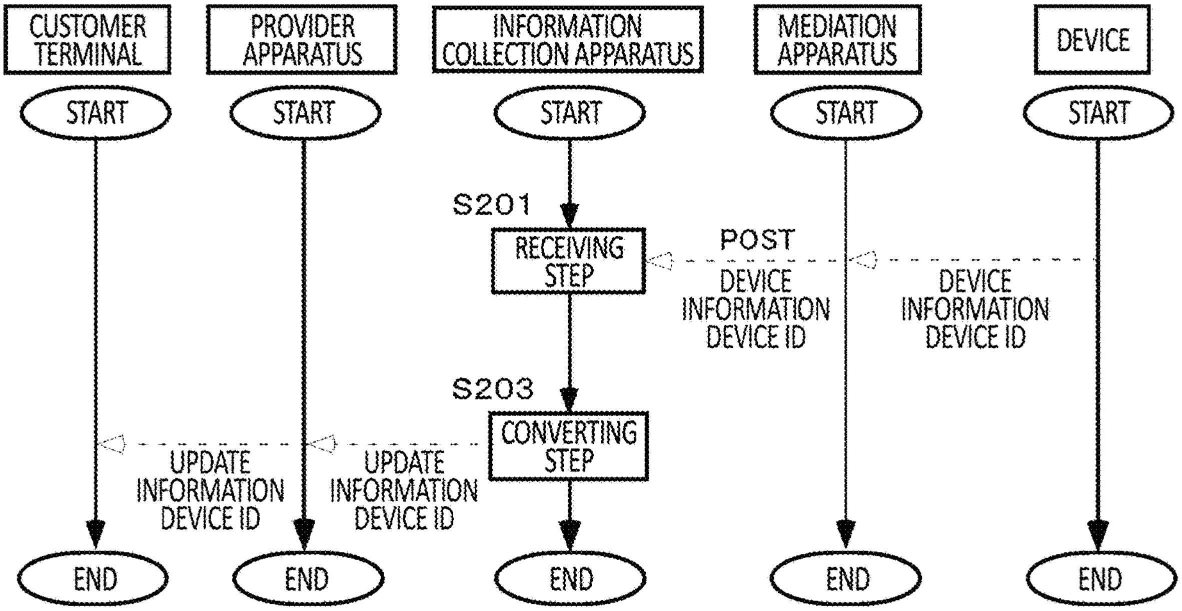
FIG. 3 is a flow diagram of an exemplary second information collection method.

FIG. 3 is a flow diagram of an exemplary second information collection method. The flow is started by a mediation apparatus 200 instructing one or more devices 210 connected to the mediation apparatus 200 to send device information together with device IDs and sending these data received from the one or more devices 210 to an information collection apparatus 100. The device information is, for example, the state information mentioned above. It should be noted that the flow is periodically repeated, that is, the mediation apparatus 200 periodically collects the device information on the device 210 and provides it to the information collection apparatus 100.

The information collection apparatus 100 receives the device information through one or more mediation apparatuses 200 (step S201). As mentioned above, in the information collection apparatus 100 in the present embodiment, a communication unit 110 receives the device information together with device IDs of the one or more devices 210.

The information collection apparatus 100 distributes update information received from the one or more mediation apparatuses 200 to one or more provider apparatuses 300 (step S203). More specifically, a conversion unit 120 of the information collection apparatus 100 converts the device information into the update information in a manner unique to each of the one or more provider apparatuses 300, among a plurality of provider apparatuses 300, that manage the device 210 corresponding to the device information received in the step S201. More specifically, the conversion unit 120 specifies, by referring to a storage unit 130, one or more provider apparatus IDs linked to the device IDs received by the communication unit 110, as the one or more provider apparatuses 300.

The conversion unit 120 further distributes the update information to the one or more provider apparatuses 300. More specifically, the conversion unit 120 distributes the device IDs and the update information to the one or more provider apparatuses 300 corresponding to the one or more provider apparatus IDs that have been specified, through the communication unit 110.

As a more specific example of the step S201 to the step S203, a WebAPI of the information collection apparatus 100 simultaneously distribute, to predetermined provider apparatus IDs, the state information and the device IDs of the devices that are periodically POSTed from the one or more mediation apparatuses 200 with an endpoint of post /status/:deviceid designated. The mediation apparatus 200 uses an API-KEY for access when POSTing the data described above to the WebAPI. By authenticating the API-KEY, the WebAPI specifies a preregistered customer ID, and unilaterally simultaneously distributes the update information obtained at post /status/:deviceid to the one or more provider apparatuses 300 with which a customer 410 has a contract.

The provider apparatus 300 sends the device IDs and the update information received from the information collection apparatus 100 to a customer terminal 400 of a customer ID linked to the device IDs, and the flow ends. It should be noted that, in response to the customer 410 requesting, through the customer terminal 400, to view the update information, the provider apparatus 300 may allow the customer 410 to view the update information on the Web.

In the embodiment described above, each of the provider apparatuses 300 may retain the update information on each of the devices 210 as information to be managed for each customer 410, so that the customer 410 can view it at any time. At that time, each of the provider apparatuses 300 receives the customer ID from the customer terminal 400 of the customer 410 and collates it with the customer ID linked to the update information on each of the devices 210, so that each customer 410 can view only information on the device 210 handled by himself/herself.

Here, as a comparative example with an information collection system 10 in the present embodiment, a system is assumed which includes a provision apparatus which provides, in order for a user to remotely manage a device, a service of: presenting, to the user, status information on the device periodically received from a mediation apparatus connected to the device; sending, to the mediation apparatus, a command being based on an input of the user; or presenting, to the user, a result of execution of the command received from the mediation apparatus. The provision apparatus sends and receives information to and from the mediation apparatus in a unique manner through its own API.

When there are a plurality of provision apparatuses managed by a plurality of service providers, the manner will also be of great variety. In such a case, the user may attempt to utilize the plurality of provision apparatuses at the same time, or to switch from one provision apparatus to another provision apparatus. However, in order for the device to be managed by the user or the mediation apparatus connected to the device to bidirectionally communicate with a new provision apparatus, it is necessary to reset, for example, a firewall for each provision apparatus. In addition, the user needs to individually register an ID of the device to be managed by the user, an ID of the mediation apparatus connected to the device, or the like, for each provision apparatus. In addition, when, despite of managing the same device through the same mediation apparatus, the plurality of provision apparatuses do not synchronize the device information on the device with each other, they cannot correctly manage the device.

In contrast, according to the information collection system 10 in the present embodiment, even if there are a plurality of provider apparatuses 300, each of which sends and receives data in a unique manner, the information collection apparatus 100 sends and receives the data to and from each of the provider apparatuses 300 in the unique manner, and on the other hand, sends and receives the data to and from each of the mediation apparatuses 200 in a manner such that any mediation apparatus 200 can recognize it. That is, the information collection apparatus 100 can serve as a bridge between the mediation apparatus 200 and the provider apparatus 300, and play a role of converting data received from one apparatus into data that can be handled by another apparatus and delivering the converted data. In addition, the information collection apparatus 100 simultaneously distributes the data received from the mediation apparatus 200 to the plurality of provider apparatuses 300 with which the customer 410 has a contract, and synchronizes the data. Therefore, the information collection apparatus 100 can solve a problem in the comparative example mentioned above.

In addition, the information collection apparatus 100 sends information on each of the devices 210 obtained through the mediation apparatus 200 to the plurality of provider apparatuses 300 as the information to be managed for each customer 410. Therefore, according to the information collection apparatus 100, a system can be constructed with easy setting, which allows the customer 410 to view the information on each of the devices 210 on the provider apparatus 300 providing a desired service. In addition, according to the information collection apparatus 100, the plurality of provider apparatuses 300 providing the service to the customer 410 can serve as a hub for remote maintenance of the device 210 owned by the customer 410.

In addition, according to the information collection apparatus 100, new addition and deletion of a supporting provider apparatus 300 can also be set in a simple way on a customer 410-by-customer 410 basis.

In the embodiment described above, the mediation apparatus 200 has been described as having a configuration in which second job information being based on first job information generated by the one or more provider apparatuses 300 is obtained from the information collection apparatus 100 through a communication network 50. In addition, the second job information has been described as describing the specific processing in a manner such that at least the mediation apparatus 200 can recognize it. Here, in a more specific example, the mediation apparatus 200 may interpret the second job information, download an update file from a specific URL added to the second job information as part of the specific processing executed by the mediation apparatus 200 itself, and send the update file to the device 210.

When the information collection apparatus 100 sends the update file to the mediation apparatus 200 through the communication network 50 and the firewall, if there are many kinds of mediation apparatuses 200 or devices 210, it will be necessary to send different update files depending on these kinds, and also an update file of a relatively large capacity will be sent to each of the mediation apparatuses 200 or each of the devices 210, so there is a possibility that a predetermined upper limit of communication volume will be reached. Therefore, when the mediation apparatus 200 is provided in a LAN 250 protected by the firewall, it is preferable that the information collection apparatus 100 sends the second job information with the URL mentioned above added thereto to the mediation apparatus 200, and the mediation apparatus 200 downloads the update file from the URL, thereby avoiding the problem. It should be noted that the URL may be designated by the information collection apparatus 100, the provider apparatus 300, or the like.

Figure 4:
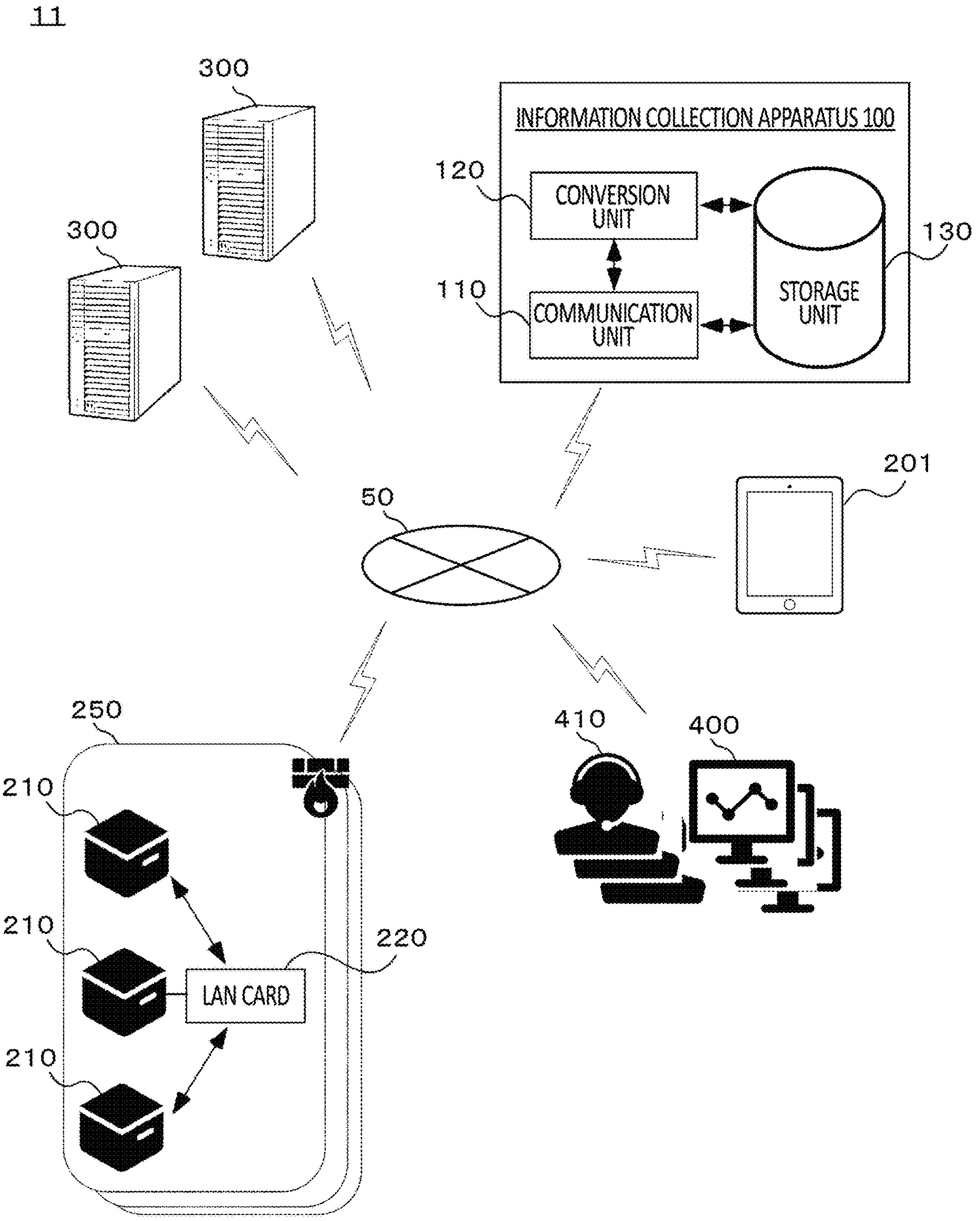
FIG. 4 is a schematic view of an information collection system 11.

FIG. 4 is a schematic view of an information collection system 11. The information collection system 11 in the present embodiment is different from the information collection system 10 described by using FIG. 1 to FIG. 3 in that a mediation apparatus 201 is not placed in a LAN 250 being under the management of a customer 410, and communicates with a LAN card 220 placed in the LAN 250 through a communication network 50. The mediation apparatus 201 is placed in a center (cloud), for example. Other than this point, the information collection system 11 in the present embodiment is the same as the information collection system 10, so the same reference numerals will be used for configurations corresponding to configurations in the information collection system 10, and repeated description will be omitted.

In the present embodiment, a plurality of customers 410 use the same mediation apparatus 201. That is, one mediation apparatus 201 communicates with LAN cards 220 being in LANs 250 of the plurality of customers 410. Such a manner may be referred to as a single-board manner.

The mediation apparatus 201 retains an API-KEY designated for each of the customers 410, and selects one from among a plurality of API-KEYs to access an information collection apparatus 100. As a more specific example of the present embodiment, the LAN card 220 is attached to one of one or more devices 210 placed in the LAN 250. The LAN card 220 uses a data format called XML, and includes a communication function going beyond a firewall.

The mediation apparatus 201 is periodically polled from a plurality of LAN cards 220. At this time, the LAN cards 220 access the mediation apparatus 201 by using basic authentication of USERNAME and PASSWORD. The mediation apparatus 201 converts XML format data of the LAN cards 220 into a JSON format data (format conversion), and accesses a WebAPI of the information collection apparatus 100. At that time, the mediation apparatus 201 generates, from USERNAME and PASSWORD of the LAN card 220 set for each of the customers 410, an API-KEY corresponding to the customer 410, and accesses the information collection apparatus 100 by using the API-KEY.

The information collection system 11 in the present embodiment also has an effect similar to that of the information collection system 10 described by using FIG. 1 to FIG. 3.

In the plurality of embodiments described above, the information collection apparatus 100 has been described as simultaneously distributing update information to one or more provider apparatuses 300 with which the customer 410 has a contract. In these embodiments, it can be said that at least any one of the one or more devices 210 and one or more mediation apparatuses 200 is associated with a plurality of provider apparatuses 300 in a one-to-multiple relationship. In this case, a communication unit 110 of the information collection apparatus 100 receives, from the one or more mediation apparatuses 200, result information indicating a result of a target caused to execute a specific processing executing the specific processing in accordance with second job information. The conversion unit 120 converts the result information into the update information in a manner unique to each of the plurality of provider apparatuses 300 associated with at least any one of the one or more devices 210 and the one or more mediation apparatuses 200, and simultaneously distributes the update information to the plurality of provider apparatuses 300.

Various embodiments of the present invention may be described with reference to flowcharts and block diagrams, where blocks may represent (1) stages of processes in which operations are executed or (2) sections of apparatuses responsible for executing operations. Certain stages and sections may be implemented by dedicated circuit, programmable circuit supplied together with computer readable instructions stored on computer readable media, and/or processors supplied together with computer readable instructions stored on computer readable media. Dedicated circuit may include digital and/or analog hardware circuits, and may include integrated circuits (IC) and/or discrete circuits. The programmable circuit may include a reconfigurable hardware circuit including logical AND, logical OR, logical XOR, logical NAND, logical NOR, and other logical operations, a memory element or the like such as a flip-flop, a register, a field programmable gate array (FPGA) and a programmable logic array (PLA), or the like.

A computer readable medium may include any tangible device that can store instructions to be executed by a suitable device, and as a result, the computer readable medium having instructions stored thereon includes a product including instructions that can be executed in order to create means for executing operations designated in the flowcharts or block diagrams. Examples of the computer readable medium may include an electronic storage medium, a magnetic storage medium, an optical storage medium, an electromagnetic storage medium, a semiconductor storage medium, and the like. More specific examples of the computer readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, or the like.

The computer readable instruction may include: an assembler instruction, an instruction-set-architecture (ISA) instruction; a machine instruction; a machine dependent instruction; a microcode; a firmware instruction; state-setting data; or either a source code or an object code described in any combination of one or more programming languages, including an object oriented programming language such as Smalltalk (registered trademark), JAVA (registered trademark), C++, or the like, and a conventional procedural programming language such as a "C" programming language or a similar programming language.

Computer readable instructions may be provided to a processor of a general-purpose computer, special purpose computer, or other programmable data processing apparatuses, or to programmable circuit, locally or through a local area network (LAN), wide area network (WAN) such as the Internet, or the like, so that the computer readable instructions are executed in order to create means for executing operations designated in the flowcharts or block diagrams. Examples of the processor include a computer processor, a processing unit, a microprocessor, a digital signal processor, a controller, a microcontroller, and the like.

Figure 5:
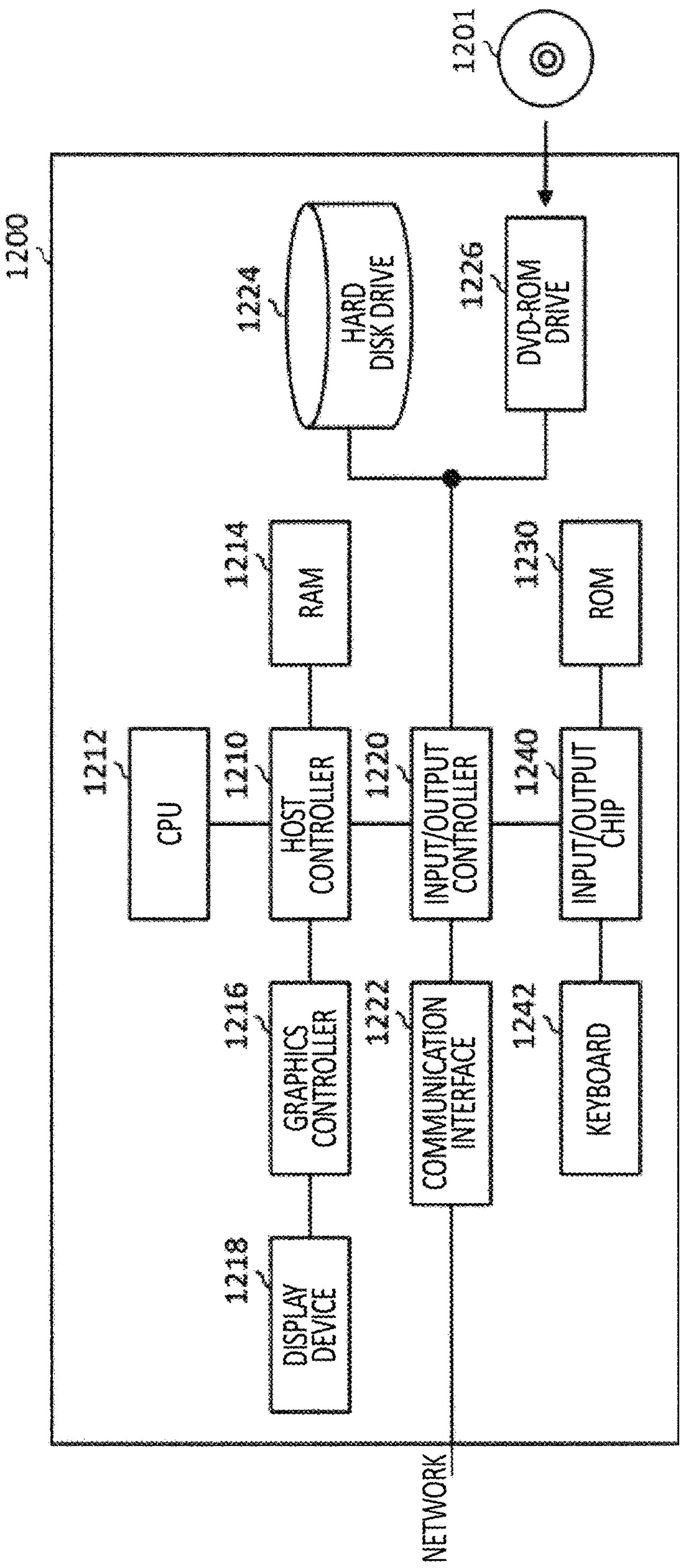
FIG. 5 illustrates an example of a computer 1200 in which a plurality of aspects of the present invention may be entirely or partially embodied.

FIG. 5 shows an example of a computer 1200 in which a plurality of aspects of the present invention may be entirely or partially embodied. A program installed on the computer 1200 can cause the computer 1200 to function as an operation associated with an apparatus according to embodiments of the present invention or as one or more "unit(s)" of the apparatus, or to execute the operation or the one or more "unit(s)", and/or can cause the computer 1200 to execute processes according to embodiments of the present invention or stages of the processes. Such a program may be executed by a CPU 1212 to cause the computer 1200 to execute certain operations associated with some or all blocks in the flowcharts or block diagrams described in the present specification.

The computer 1200 according to the present embodiment includes a CPU 1212, a RAM 1214, a graphics controller 1216 and a display device 1218, which are connected to each other by a host controller 1210. The computer 1200 also includes input/output units such as a communication interface 1222, a hard disk drive 1224, a DVD-ROM drive 1226 and an IC card drive, which are connected to the host controller 1210 through an input/output controller 1220. The computer also includes legacy input/output units such as a ROM 1230 and a keyboard 1242, which are connected to the input/output controller 1220 through an input/output chip 1240.

The CPU 1212 operates in accordance with programs stored in the ROM 1230 and the RAM 1214, thereby controlling each unit. The graphics controller 1216 obtains image data generated by the CPU 1212 on a frame buffer or the like provided in the RAM 1214 or in the graphics controller 1216 itself, and displays the image data on the display device 1218.

The communication interface 1222 communicates with other electronic devices through a network. The hard disk drive 1224 stores programs and data to be used by the CPU 1212 in the computer 1200. The DVD-ROM drive 1226 reads programs or data from the DVD-ROM 1201, and provides the programs or data to the hard disk drive 1224 through the RAM 1214. The IC card drive reads the program and data from an IC card, and/or writes the program and data to the IC card.

The ROM 1230 has stored therein a boot program or the like to be executed by the computer 1200 at the time of activation, and/or a program that depends on the hardware of the computer 1200. The input/output chip 1240 may also connect various input/output units to the input/output controller 1220 through a parallel port, a serial port, a keyboard port, a mouse port or the like.

Programs are provided by a computer readable storage medium such as the DVD-ROM 1201 or an IC card. The programs are read from the computer readable storage medium, installed on the hard disk drive 1224, the RAM 1214 or the ROM 1230, which are also examples of a computer readable storage medium, and executed by the CPU 1212. Information processing described in these programs is read by the computer 1200, and provides cooperation between the programs and the various types of hardware resources described above. An apparatus or method may be constituted by realizing the operation or processing of information in accordance with the usage of the computer 1200.

For example, if a communication is executed between the computer 1200 and external devices, the CPU 1212 may execute a communication program loaded on the RAM 1214, and instruct the communication interface 1222 to perform communication process based on the process described in the communication program. Under the control of the CPU 1212, the communication interface 1222 reads send data stored in a send buffer region provided in a recording medium such as the RAM 1214, the hard disk drive 1224, the DVD-ROM 1201 or an IC card, and sends the read send data to the network, or writes reception data received from the network into a reception buffer region or the like provided in the recording medium.

In addition, the CPU 1212 may also make all or required portions of the files or databases stored in an external recording medium such as the hard disk drive 1224, the DVD-ROM drive 1226 (DVD-ROM 1201), an IC card, or the like to be read by the RAM 1214, and execute various types of processing on the data on the RAM 1214. Next, the CPU 1212 may write the processed data back in the external recording medium.

Various types of information such as various types of programs, data, tables and databases may be stored in the recording medium for information processing. The CPU 1212 may execute, on the data read from the RAM 1214, various types of processing including various types of operations, information processing, conditional judgement, conditional branching, unconditional branching, information search/replacement, or the like described throughout the present disclosure and designated by instruction sequences of the programs, to write the results back to the RAM 1214. In addition, the CPU 1212 may search for information in a file, a database, or the like in the recording medium. For example, when a plurality of entries, each having an attribute value of a first attribute associated with an attribute value of a second attribute, are stored in the recording medium, the CPU 1212 may search the plurality of entries for an entry whose attribute value of the first attribute matches a designated condition, and read the attribute value of the second attribute stored in the entry, thereby obtaining the attribute value of the second attribute associated with the first attribute that meets a predetermined condition.

The programs or software modules in the above description may be stored on the computer 1200 or a computer readable storage medium near the computer 1200. In addition, a recording medium such as a hard disk or a RAM provided in a server system connected to a dedicated communication network or the Internet can be used as a computer readable storage media, thereby providing programs to the computer 1200 through the network.

While the present invention has been described by way of the embodiments, the technical scope of the present invention is not limited to the above-described embodiments. It is apparent to persons skilled in the art that various alterations or improvements can be made to the above-described embodiments. In addition, the matters described with regard to the particular embodiment can be applied to other embodiments with a range without causing technical contradictions. In addition, each constitutional element may have features similar to those of other constitutional elements which have the same name and have the different numerals. It is also apparent from the described scope of the claims that the embodiments added with such alterations or improvements can be included the technical scope of the present invention.

The operations, procedures, steps, stages, or the like of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10, 11: information collection system;
50: communication network;
100: information collection apparatus;
110: communication unit;
120: conversion unit;
130: storage unit;
200, 201: mediation apparatus;
210: device;
220: LAN card;
250: LAN;
300: provider apparatus;
400: customer terminal;
410: customer;
1200: computer;
1201: DVD-ROM;
1210: host controller;
1212: CPU;
1214: RAM;
1216: graphics controller;
1218: display device;
1220: input/output controller;
1222: communication interface;
1224: hard disk drive;
1226: DVD-ROM drive;
1230: ROM;
1240: input/output chip; and
1242: keyboard.

What is claimed is:

1. An information collection apparatus which collects information on one or more devices through one or more mediation apparatuses, the information collection apparatus comprising:

a communication unit which receives, from a plurality of provider apparatuses that provide a customer with a service of managing the one or more devices, first job information describing a specific processing that a target is caused to execute, in a manner unique to each of the plurality of provider apparatuses, the target including both the one or more mediation apparatuses and the one or more devices, or only the one or more mediation apparatuses; and a conversion unit which converts the first job information received by the communication unit into second job information describing the specific processing that the target is caused to execute in a manner such that the one or more mediation apparatuses can recognize it, and delivers the second job information to the one or more mediation apparatuses through the communication unit.

2. The information collection apparatus according to claim 1, wherein at least any one of the one or more devices and the one or more mediation apparatuses is associated with the plurality of provider apparatuses in a one-to-multiple relationship, the communication unit receives result information indicating a result of the target executing the specific processing in accordance with the second job information, from the one or more mediation apparatuses, and the conversion unit converts the result information into update information in a manner unique to each of the plurality of provider apparatuses associated with the at least any one, and simultaneously distributes the update information to the plurality of provider apparatuses.

3. The information collection apparatus according to claim 2, wherein the conversion unit delivers third job information that describes a processing of causing result information indicating a result of the target executing the specific processing in accordance with the second job information to be returned to the information collection apparatus, in a manner such that the one or more mediation apparatuses can recognize it, to the one or more mediation apparatuses through the communication unit together with the second job information.

4. The information collection apparatus according to claim 2, wherein the communication unit receives, from the plurality of provider apparatuses together with the first job information, a customer ID of a customer who is managing a device caused to execute the specific processing based on the first job information, and the conversion unit links the second job information to the customer ID received by the communication unit.

5. The information collection apparatus according to claim 4, further comprising a storage unit which stores, in a mutually linked manner, an API-KEY of each of the one or more mediation apparatuses and a customer ID of each of one or more customers provided with the service from the plurality of provider apparatuses, wherein the conversion unit specifies, by referring to the storage unit, a customer ID corresponding to an API-KEY presented by the one or more mediation apparatuses requesting reception and delivery of the second job information, and when the customer ID corresponding to the API-KEY matches the customer ID linked to the second job information, delivers the second job information to the one or more mediation apparatuses requesting the reception and delivery of the second job information, through the communication unit.

6. The information collection apparatus according to claim 1, wherein the conversion unit delivers third job information that describes a processing of causing result information indicating a result of the target executing the specific processing in accordance with the second job information to be returned to the information collection apparatus, in a manner such that the one or more mediation apparatuses can recognize it, to the one or more mediation apparatuses through the communication unit together with the second job information.

7. The information collection apparatus according to claim 6, wherein the communication unit receives, from the plurality of provider apparatuses together with the first job information, a customer ID of a customer who is managing a device caused to execute the specific processing based on the first job information, and the conversion unit links the second job information to the customer ID received by the communication unit.

8. The information collection apparatus according to claim 7, further comprising a storage unit which stores, in a mutually linked manner, an API-KEY of each of the one or more mediation apparatuses and a customer ID of each of one or more customers provided with the service from the plurality of provider apparatuses, wherein the conversion unit specifies, by referring to the storage unit, a customer ID corresponding to an API-KEY presented by the one or more mediation apparatuses requesting reception and delivery of the second job information, and when the customer ID corresponding to the API-KEY matches the customer ID linked to the second job information, delivers the second job information to the one or more mediation apparatuses requesting the reception and delivery of the second job information, through the communication unit.

9. The information collection apparatus according to claim 1, wherein the communication unit receives, from the plurality of provider apparatuses together with the first job information, a customer ID of a customer who is managing a device caused to execute the specific processing based on the first job information, and the conversion unit links the second job information to the customer ID received by the communication unit.

10. The information collection apparatus according to claim 9, further comprising a storage unit which stores, in a mutually linked manner, an API-KEY of each of the one or more mediation apparatuses and a customer ID of each of one or more customers provided with the service from the plurality of provider apparatuses, wherein the conversion unit specifies, by referring to the storage unit, a customer ID corresponding to an API-KEY presented by the one or more mediation apparatuses requesting reception and delivery of the second job information, and when the customer ID corresponding to the API-KEY matches the customer ID linked to the second job information, delivers the second job information to the one or more mediation apparatuses requesting the reception and delivery of the second job information, through the communication unit.

11. The information collection apparatus according to claim 10, wherein the communication unit receives, from the plurality of provider apparatuses together with the first job information and the customer ID, a device ID of a device caused to execute the specific processing based on the second job information corresponding to the first job information, and the conversion unit links the second job information to the customer ID and the device ID received by the communication unit, and when the customer ID corresponding to the API-KEY matches the customer ID linked to the second job information, delivers the second job information to the one or more mediation apparatuses requesting the reception and delivery of the second job information, through the communication unit together with the device ID.

12. The information collection apparatus according to claim 10, wherein the storage unit stores, in a mutually linked manner, a provider apparatus ID of each of the plurality of provider apparatuses and a device ID of each of the one or more devices, the communication unit receives result information indicating a result of a device connected to the one or more mediation apparatuses to which the second job information has been delivered executing the specific processing in accordance with the second job information, from the one or more mediation apparatuses to which the second job information has been delivered, together with the device ID of the device that has executed the specific processing, and the conversion unit specifies, by referring to the storage unit, one or more provider apparatus IDs including the provider apparatus ID that are linked to the device ID received by the communication unit, converts the result information into update information in a manner unique to each of one or more provider apparatuses corresponding to the one or more provider apparatus IDs including the provider apparatus ID, and distributes the device ID and the update information to the one or more provider apparatuses corresponding to the one or more provider apparatus IDs including the provider apparatus ID through the communication unit.

13. The information collection apparatus according to claim 9, wherein the communication unit receives, from the plurality of provider apparatuses together with the first job information, a customer ID of a customer who is managing a device caused to execute the specific processing based on the first job information, and the conversion unit links the second job information to the customer ID received by the communication unit.

14. The information collection apparatus according to claim 1, wherein the manner unique to each of the provider apparatuses is one of script designation via a remote shell (rsh), script designation via a secure shell (SSH), or script designation through email automatic processing.

15. An information collection method for collecting information on one or more devices through one or more mediation apparatuses, the information collection method comprising:

receiving, from a plurality of provider apparatuses that provide a customer with a service of managing the one or more devices, first job information describing a specific processing that a target is caused to execute, in a manner unique to each of the plurality of provider apparatuses, the target including both the one or more mediation apparatuses and the one or more devices, or only the one or more mediation apparatuses; and performing conversion by converting the first job information received in the receiving into second job information describing the specific processing that the target is caused to execute in a manner such that the one or more mediation apparatuses can recognize it, and by delivering the second job information to the one or more mediation apparatuses.

16. A non-transitory computer readable storage medium having stored thereon a program that, when executed by a computer, causes the computer to execute an information collection method for collecting information on one or more devices through one or more mediation apparatuses, the information collection method comprising:

receiving, from a plurality of provider apparatuses that provide a customer with a service of managing the one or more devices, first job information describing a specific processing that a target is caused to execute, in a manner unique to each of the plurality of provider apparatuses, the target including both the one or more mediation apparatuses and the one or more devices, or only the one or more mediation apparatuses; and performing conversion by converting the first job information received in the receiving into second job information describing the specific processing that the target is caused to execute in a manner such that the one or more mediation apparatuses can recognize it, and by delivering the second job information to the one or more mediation apparatuses.

* * * * *